United States Patent [19]

Kagami et al.

[11] Patent Number: 5,249,168
[45] Date of Patent: Sep. 28, 1993

[54] METHOD AND APPARATUS FOR INITIALIZING OPTICAL DISK DRIVE APPARATUS

[75] Inventors: Naoyuki Kagami, Fujisawa; Hiroaki Kubo, Atsugi; Hideo Ueno, Yamato, all of Japan

[73] Assignee: International Business Machines Corporation, Armonk, N.Y.

[21] Appl. No.: 755,953

[22] Filed: Sep. 6, 1991

[30] Foreign Application Priority Data

Sep. 27, 1990 [JP] Japan ................... 2-255469

[51] Int. Cl.⁵ .................. G11B 5/596; G11B 7/08
[52] U.S. Cl. .................. 369/44.27; 369/44.28; 369/44.25; 369/32; 369/58; 360/78.04; 360/78.14
[58] Field of Search ............... 369/44.11, 44.28, 44.27, 369/44.32, 50, 43, 53, 56, 57, 58, 32, 54, 44.25; 360/77.03, 77.02, 78.14, 61, 75, 69, 78.04, 78.01, 78.03

[56] References Cited

U.S. PATENT DOCUMENTS 5,034,941 7/1991 Kasai et al. ................ 369/44.27
5,063,549 11/1991 Yamamuro .................. 369/44.28

Primary Examiner—Aristotelis Psitos
Assistant Examiner—Muhammad N. Edun
Attorney, Agent, or Firm—D. A. Shifrin; C. E. Rohrer

[57] ABSTRACT

A method and apparatus for initializing disk drive apparatus wherein a pickup head is positioned near the mid-range of tracks on a disk by moving the head at power-on to an innermost track and thereafter moving the head outwardly. As outward movement begins, a tracking error signal is sensed to indicate a track crossing, and the number of tracks crossed are counted until the head is at the mid-range of tracks. A velocity profile is used to speed movement of the head to its destination.

4 Claims, 2 Drawing Sheets

METHOD AND APPARATUS FOR INITIALIZING OPTICAL DISK DRIVE APPARATUS

The invention relates to an optical disk drive apparatus, and is particularly concerned with a method and apparatus for initializing movement of the optical disk pickup head.

BACKGROUND OF THE INVENTION

In an optical disk apparatus for reading and reproducing a signal recorded in a recording track on an optical disk, a pickup head is moved to a target track so that an optical beam may be projected thereon in order to read a recorded signal.

Before the optical pickup head is moved, an initialize operation is performed to position the optical pickup at a known track on the optical disk. FIG. 3 is a schematic view showing the construction of a conventional optical disk drive apparatus. In the figure, a linear scale 1 having notched grooves is attached to a drive apparatus body (not shown in the figure) and a dedicated sensor 2 for reading the number of the grooves on the linear scale 1 is attached to an optical pickup 3.

In an initializing operation in such a case, the optical pickup 3 is first driven to hold the optical pickup 3 against one end of the linear scale 1. Then the optical pickup 3 is moved from that end toward the other end. Sensor 2 reads the number of grooves through which the optical pickup 3 is moving. When the number of grooves (tracks) read by the dedicated sensor 2 reaches a predetermined number, the optical pickup 3 stops. Thus the optical pickup 3 apparatus can be positioned near the mid-range of the optical disk.

Further, the optical pickup 3 can be moved to a target track under dedicated servo control through the use of the dedicated sensor 2.

Instead of the linear scale 1 and the dedicated sensor 2, means such as a potentiometer, can be used.

In the conventional method for initializing an optical disk drive apparatus, a dedicated sensor for detecting the absolute position of an optical pickup is needed to position the optical pickup near the mid-range of the optical disk. This presents a problem in that an expensive large-sized apparatus is needed. In the case of a conventional optical disk drive apparatus which is not provided with the above dedicated sensor, there is another problem in that an initializing operation cannot be performed.

SUMMARY OF THE INVENTION

An object of the invention is to solve the above problems, more particularly, to provide a method for initializing an optical disk drive apparatus wherein an optical pickup can be positioned near the mid-range of an optical disk through use of a tracking error signal thus avoiding the use of a dedicated sensor. In that manner the optical pickup can be positioned even if the apparatus is at a tilt.

According to a method for initializing an optical disk drive apparatus concerned with the invention, an optical pickup is placed first on the innermost circumference of an optical disk, then the optical pickup moves toward the outer area of the optical disk by force gradually applied on the optical pickup, the optical pickup moves slowly at a time when the generation of a tracking error signal (TES) is detected, the optical pickup accelerates after the TES has been detected and then decelerates, and finally stops so that the optical pickup is positioned near the mid-range of the optical disk.

BRIEF DESCRIPTION OF THE DRAWING

The foregoing features and advantages of the invention will be apparent from the following more detailed description of the invention, as illustrated in the accompanying drawing.

DETAILED DESCRIPTION

Figure 1:
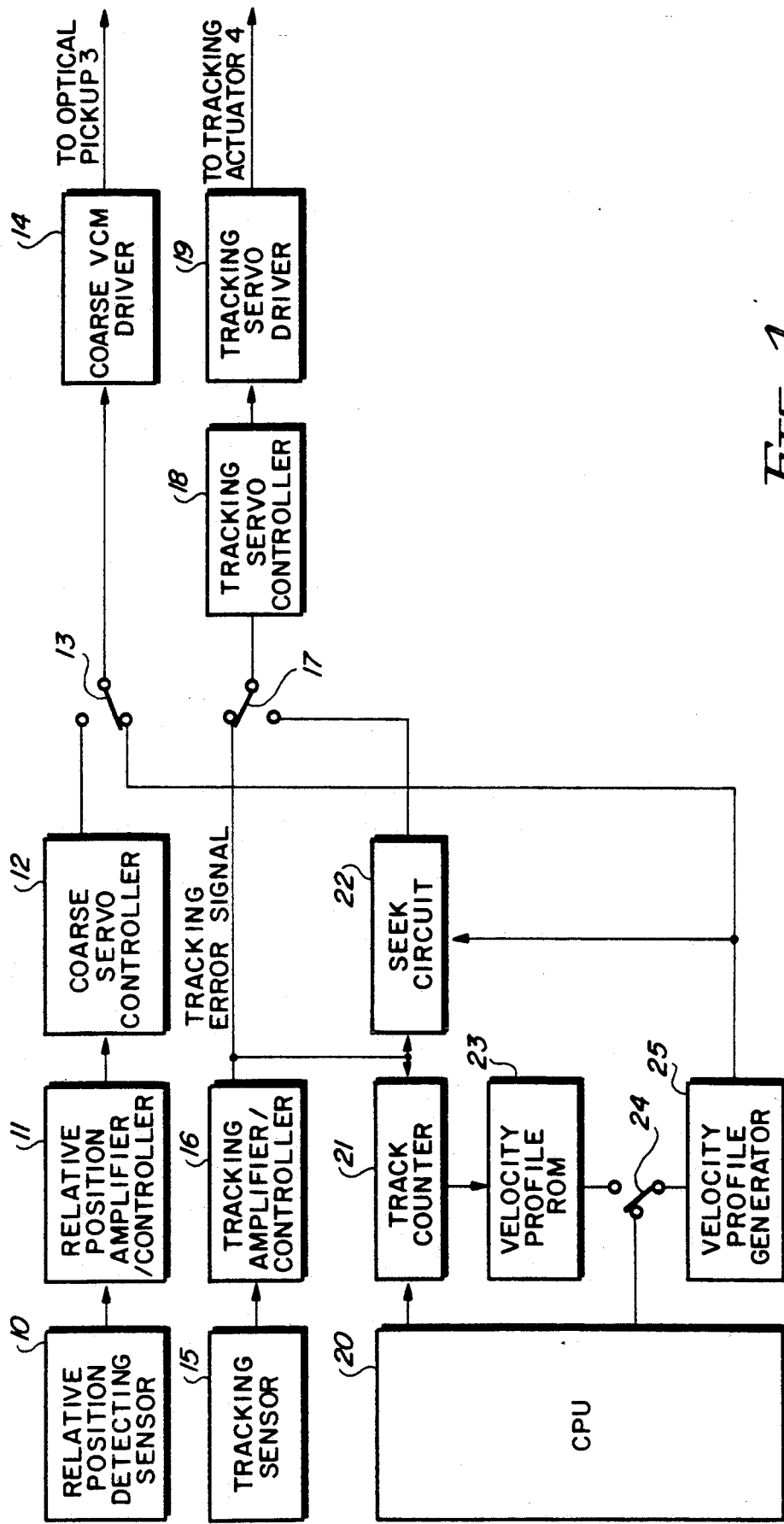
FIG. 1 is a block diagram showing a driver of an optical disk drive apparatus according to an embodiment of the invention.
Figure 2:
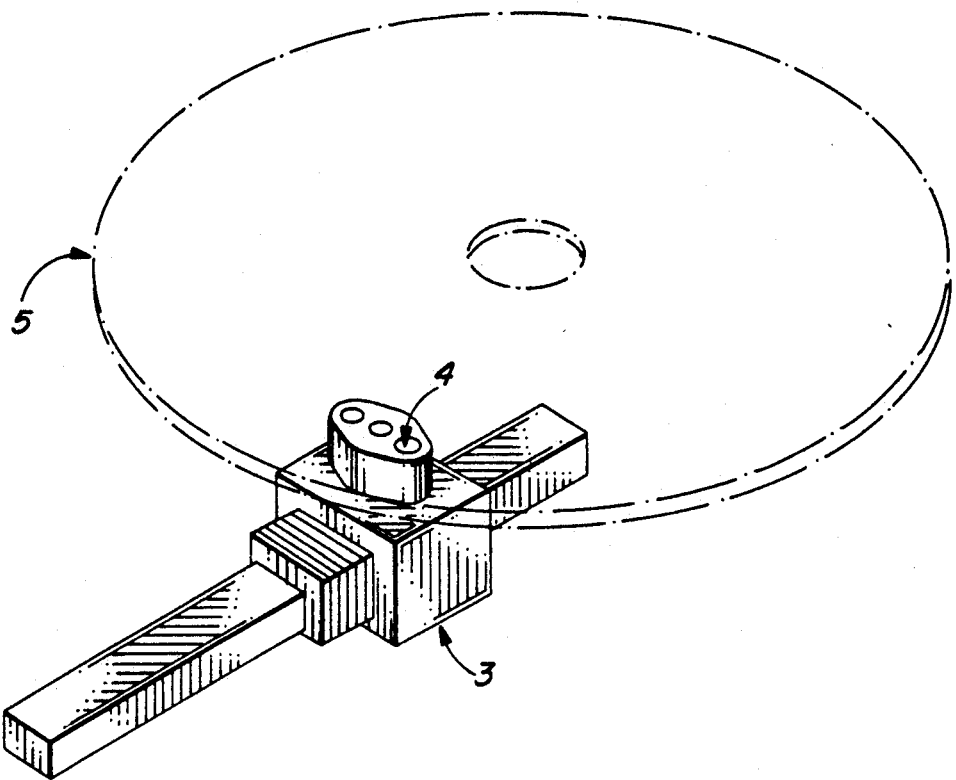
FIG. 2 is a schematic view showing the construction of an optical disk drive apparatus which can employ the driver of FIG. 1.
Figure 3:
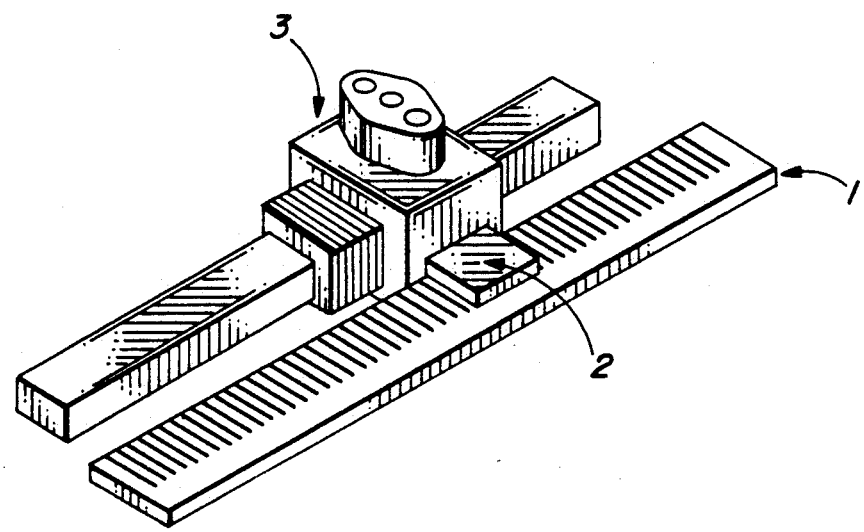
FIG. 3 is a schematic view showing the construction of a conventional optical disk drive apparatus.

FIG. 1 is a block diagram showing a driver in an optical disk drive apparatus according to an embodiment of the invention. FIG. 2 is a schematic view of an optical disk drive apparatus. In FIG. 1, an output of a relative position sensor 10 is connected, through a relative position amplifier/controller 11, to a coarse servo controller 12. An output of the coarse servo controller 12 is connected, through one switching terminal of a first switch 13, to a coarse voice coil motor (VCM) driver 14 in order to move the optical pickup head 3 shown in FIG. 2.

An output of a tracking sensor 15 is connected to a tracking amplifier/controller 16. The tracking amplifier/controller 16 is connected to a track counter 21, a seek circuit 22, and through one switching terminal of a second switch 17, to a tracking servo controller 18. An output of the tracking servo controller 18 is connected to a tracking VCM driver 19 to operate a tracking actuator 4. The track counter 21 is connected to a CPU 20 as well as to the seek circuit 22 and a velocity profile ROM 23. One switching terminal of a third switch 24 is connected to the CPU 20 while the other switching terminal of the third switch 24 is connected to the velocity profile ROM 23. A velocity profile generator 25 is connected to the third switch 24, the seek circuit 22, and the other switching terminal of the first switch 13. The velocity profile generator 25 has the function of a digital to analog converter (DAC).

Operation of the apparatus is described referring to FIG. 1 and FIG. 2.

After initial power-on, the initialization operation is begun with the third switch 24 operated so that the CPU 20 is connected to velocity profile generator 25 thereby allowing the CPU 20 to provide the velocity profile generator 25 with velocity profile data. The data is converted to analog data by the velocity profile generator 25 in order to move the optical pickup 3, shown in FIG. 2, toward the innermost track of disk 5. This movement is accomplished by the coarse VCM driver 14. Next, the CPU 20 provides the velocity profile generator 25 with predetermined velocity profile data to cause a predetermined driving signal to be supplied to the coarse VCM driver 14 in order to move the optical pickup 3 toward the outer area of the optical disk 5. Thereupon, the tracking sensor 15 is used to detect a track crossing thereby providing a tracking error signal (TES) generated at a time when a laser beam from the optical pickup 3 crosses tracks on the optical disk 5. The TES signal is applied to the track counter 21. By examining a value of the track counter 21 at all times, the movement of the optical pickup 3 is checked to detect the track position of optical pickup 3.

If the optical disk drive apparatus is inclined to one side, the CPU 20 continues to provide the velocity profile generator 25 with a signal to cause movement of the optical pickup 3 toward the outer area on the optical disk 5 until the optical pickup 3 moves across tracks to enable the use of the predetermined profile data.

When the optical pickup 3 begins to move across tracks, the CPU 20 stores velocity profile data Vo, in the memory of the CPU 20.

Then, based on the data Vo, the CPU 20 provides the velocity profile generator 25 with velocity profile data Vo+α through the third switch 24 to accelerate and move the optical pickup 3 toward the outer area on the optical disk 5.

In this case, to check the movement of the optical pickup 3, the CPU 20 repeatedly reads out values of the track counter 21 until the CPU 20 determines that a value of the track counter 21 has reached a predetermined value.

At that time, based on the above velocity profile data Vo, CPU 20 provides the velocity profile generator 25 with the velocity profile Vo−α required to decelerate the optical pickup 3.

To complete the deceleration of the optical pickup 3, the CPU 20 repeatedly reads out values of the track counter 21, as shown above, until the CPU 20 detects that a value of the track counter 21 has reached a predetermined value.

Then, the velocity profile data is changed to Vo−β (where β is smaller than α). This velocity is smaller than the velocity profile data Vo and is provided to the velocity profile generator 25 to cause the optical pickup 3 to stop moving. In this case, the pickup 3 stops near the mid-range of tracks on the optical disk 5.

After initialization, the servo control operation to find a target track is begun by the relative position detecting sensor 10, the relative position detecting amplifier/controller 11, the coarse servo controller 12, the coarse VCM driver 14, and the optical pickup 3.

A tracking operation is performed by the system of the tracking sensor 15, the tracking amplifier/controller 16, the tracking servo controller 18, the tracking VCM driver 19, and the tracking actuator 4.

Further, a seek operation, after the second switch 17 is switched to the seek circuit 22, is provided by a loop formed by the track counter 21, the velocity profile ROM 23, the third switch 24, velocity profile generator 25, and the seek circuit 22. Since the seek operation thus performed is the same as a conventional seek operation, further particulars are not described.

In the above embodiment, a track counter is used to receive the TES; however, it will be appreciated that a TES signal can be directly input to the CPU 20 for the purpose of having the same effect as in the above embodiment.

While the invention has been particularly shown and described with reference to a preferred embodiment thereof, it will be understood by those skilled in the art that various changes in form and details may be made therein without departing from the spirit and scope of the invention.

What is claimed is:

1. Disk drive apparatus for reading recorded information on the tracks of a disk which includes means for initializing the position of a pickup head to an initialized position near the mid-range of the recording tracks without a position sensor, comprising:

a pickup head;

motive means connected to said head for moving said head across tracks;

tracking sensor means located adjacent said disk for producing a tracking error signal indicating the failure of said head to follow a single track;

initializing control means connected to said motive means for causing said motive means to move said pickup head to the innermost track on said disk at power-on, and thereupon to initialize the position of said head by causing said motive means to move said head in an outwardly direction;

said initializing control means also connected to receive said tracking error signal during initialization and acting in response thereto for counting the number of tracks crossed as said head moves outwardly, comparing the number of tracks crossed with a first predetermined number representative of a predetermined mid-range of tracks on said disk and for stopping said head at the mid-range of tracks when the number of tracks crossed equals said first predetermined number.

2. The disk drive apparatus of claim 1 wherein said initializing control means includes:

a velocity profile generator means for producing a large signal to cause said motive means move said head rapidly and a small signal to move said head slowly; and processor means connected to said generator for controlling said velocity profile generator to produce said larger signal upon first receiving said tracking error signal and to produce said small signal after counting tracks to a second predetermined number, whereby said head is decelerated as it approaches said mid-range of tracks;

said processing means further controlling said generator to stop said head after crossing a third predetermined number of tracks at slow movement, the sum of said second and third predetermined numbers equalling said first predetermined number.

3. In an optical disk drive apparatus having a pickup head and tracking error detecting means, a method for initializing the position of said head at power-on to an initialized position at the mid-range of tracks on a recording disk without a position sensor, comprising the steps of:

moving said pickup head to the innermost track of said disk;

beginning the movement of said pickup head outwardly;

in response to a track crossing sensed by said tracking error detection means, moving said head outwardly at a rapid rate counting the number of tracks crossed and comparing the number of tracks crossed with first and second predetermined number of tracks;

in response to said second predetermined number of tracks crossed, moving said head to a slow rate; and in response to a predetermined number of tracks crossed at said slow rate, stopping said head movement at the initialized position at the mid-range of tracks.

4. The method of claim 3 wherein said rapid rate of movement and said slow rate of movement are in accordance with a velocity profile contained within memory means included within said apparatus, said memory means connected within said initializing control means to provide velocity profile data to a digital to analog converter.

* * * * *